US008892166B2

(12) United States Patent
Liu

(10) Patent No.: US 8,892,166 B2
(45) Date of Patent: *Nov. 18, 2014

(54) APPARATUS AND METHOD OF SECURING PRIVATE CONTENT STORED IN A MEMORY

(71) Applicant: AT&T Intellectual Property I, L.P., Atlanta, GA (US)

(72) Inventor: Huitao Liu, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,476

(22) Filed: Oct. 30, 2013

(65) Prior Publication Data

US 2014/0051397 A1    Feb. 20, 2014

Related U.S. Application Data

(63) Continuation of application No. 13/749,928, filed on Jan. 25, 2013, now Pat. No. 8,600,440, which is a continuation of application No. 13/416,234, filed on Mar. 9, 2012, now Pat. No. 8,391,923, which is a continuation of application No. 13/077,171, filed on Mar. 31, 2011, now Pat. No. 8,155,700, which is a continuation of application No. 12/145,554, filed on Jun. 25, 2008, now Pat. No. 7,953,443, which is a continuation of application No. 10/764,668, filed on Jan. 26, 2004, now Pat. No. 7,406,334.

(51) Int. Cl.

| | | |
|---|---|---|
| *H04B 1/38* | (2006.01) | |
| *H04W 8/18* | (2009.01) | |
| *H04W 12/08* | (2009.01) | |
| *H04W 12/02* | (2009.01) | |
| *H04M 1/675* | (2006.01) | |
| *G06F 21/62* | (2013.01) | |

(52) U.S. Cl.
CPC .......... *G06F 21/6245* (2013.01); *H04W 8/183* (2013.01); *H04W 12/08* (2013.01); *H04W 12/02* (2013.01); *H04M 2250/14* (2013.01); *H04M 1/675* (2013.01)
USPC ....... 455/558; 455/410; 455/411; 379/433.09

(58) Field of Classification Search
CPC ..... H04W 12/00; H04W 12/02; H04W 12/06; H04W 12/08; H04W 12/10; H04W 12/12; H04L 63/0853; H04L 9/3226; H04M 1/675; H04M 2250/14
USPC .............. 455/411, 414.1, 557, 558, 410, 420, 455/425; 379/211.05, 357.01, 357.02, 379/433.09; 710/13; 361/737; 713/152, 713/155, 161, 164, 166, 168, 182
See application file for complete search history.

(56) References Cited

U.S. PATENT DOCUMENTS 5,120,939 A    6/1992    Claus et al.
5,818,824 A    10/1998   Lu et al.
(Continued)

FOREIGN PATENT DOCUMENTS

WO    2005074452 A2    8/2005

OTHER PUBLICATIONS

PCT/US04/39816, Later publication of International Search Report mailed Jul. 6, 2006, 8 pages.

*Primary Examiner* — Dominic E Rego
(74) *Attorney, Agent, or Firm* — Toler Law Group, PC

(57) ABSTRACT

An apparatus and a method of securing private content stored in a memory are presented. The apparatus includes a processor and a memory storing instructions that, when executed by the processor, cause the processor to perform operations. The operations include accessing a private content identifier associated with private content. The private content identifier is based on international mobile subscriber identity information associated with a memory and a mobile station integrated services digital network number. The operations also include determining whether to grant or deny access to the private content based on the private content identifier and a memory device identifier associated with the memory.

20 Claims, 3 Drawing Sheets

(56) References Cited

U.S. PATENT DOCUMENTS

| | | |
|---|---|---|
| 5,867,788 A | 2/1999 | Joensuu |
| 5,884,168 A | 3/1999 | Kolev et al. |
| 5,907,616 A | 5/1999 | Brögger et al. |
| 5,933,773 A | 8/1999 | Barvesten |
| 6,212,372 B1 | 4/2001 | Julin |
| 6,324,402 B1 | 11/2001 | Waugh et al. |
| 6,415,160 B1 | 7/2002 | Wichmann |
| 6,430,407 B1 | 8/2002 | Turtiainen |
| 6,434,385 B1 | 8/2002 | Aucoeur |
| 6,445,914 B1 | 9/2002 | Findikli et al. |
| 6,463,300 B1 | 10/2002 | Oshima |
| 6,591,095 B1 | 7/2003 | Palaniswamy et al. |
| 6,603,968 B2 | 8/2003 | Anvekar et al. |
| 6,603,982 B1 | 8/2003 | Müller |
| 6,628,954 B1 | 9/2003 | McGowan et al. |
| 6,708,033 B1 | 3/2004 | Linkola et al. |
| 6,856,818 B1 | 2/2005 | Ford |
| 6,963,740 B1 | 11/2005 | Guthery et al. |
| 6,970,817 B2 | 11/2005 | Ross et al. |
| 6,978,156 B1 | 12/2005 | Papadopoulos et al. |
| 7,272,385 B2 | 9/2007 | Mirouze et al. |
| 7,406,334 B2 | 7/2008 | Liu |
| 7,412,223 B1 | 8/2008 | Yamamoto et al. |
| 7,551,913 B1 | 6/2009 | Chien |
| 7,643,786 B2 | 1/2010 | Söderbacka et al. |
| 7,953,443 B2 | 5/2011 | Liu |
| 8,155,700 B2 | 4/2012 | Liu |
| 8,391,923 B2 | 3/2013 | Liu |
| 2001/0053684 A1 | 12/2001 | Pirila |
| 2002/0062361 A1 | 5/2002 | Kivipuro et al. |
| 2002/0147924 A1 | 10/2002 | Flyntz |
| 2002/0161708 A1 | 10/2002 | Offer |
| 2003/0172090 A1 | 9/2003 | Asunmaa et al. |
| 2003/0177366 A1 | 9/2003 | de Jong |
| 2004/0005912 A1 | 1/2004 | Hubbe et al. |
| 2004/0014423 A1 | 1/2004 | Croome et al. |
| 2004/0015692 A1 | 1/2004 | Green et al. |
| 2004/0043789 A1 | 3/2004 | Gobel |
| 2004/0082346 A1 | 4/2004 | Skytt et al. |
| 2004/0162057 A1 | 8/2004 | Steininger |
| 2004/0176071 A1 | 9/2004 | Gehrmann et al. |
| 2004/0218065 A1 | 11/2004 | Schinner |
| 2005/0001711 A1 | 1/2005 | Doughty et al. |
| 2005/0020308 A1 | 1/2005 | Lai |
| 2005/0094592 A1 | 5/2005 | Schmidt |
| 2005/0153740 A1 | 7/2005 | Binzel et al. |
| 2005/0176409 A1 | 8/2005 | Carpenter |
| 2005/0192035 A1 | 9/2005 | Jiang |
| 2005/0210127 A1 | 9/2005 | Pohja et al. |
| 2006/0183500 A1 | 8/2006 | Choi |
| 2006/0276226 A1 | 12/2006 | Jiang |
| 2007/0010242 A1 | 1/2007 | Blants et al. |
| 2008/0057935 A1 | 3/2008 | Netanel et al. |
| 2008/0285730 A1 | 11/2008 | Allaway et al. |
| 2011/0171977 A1 | 7/2011 | Putkiranta |
| 2013/0137485 A1 | 5/2013 | Liu |

APPARATUS AND METHOD OF SECURING PRIVATE CONTENT STORED IN A MEMORY

CLAIM OF PRIORITY

The present application claims priority from and is a continuation of U.S. patent application Ser. No. 13/749,928 filed on Jan. 25, 2013 and entitled "Apparatus and Method of Securing Private Content Stored in a Memory," which claims priority from and is a continuation of U.S. patent application Ser. No. 13/416,234 filed on Mar. 9, 2012 and entitled "Apparatus and Method of Securing Private Content Stored in a Memory," now issued as U.S. Pat. No. 8,391,923, which claims priority from and is a continuation of U.S. patent application Ser. No. 13/077,171 filed on Mar. 31, 2011 and entitled "Apparatus and Method of Securing Private Content Stored in a Memory," now issued as U.S. Pat. No. 8,155,700, which claims priority from and is a continuation of U.S. patent application Ser. No. 12/145,554 filed on Jun. 25, 2008 and entitled "Apparatus and Method of Securing Private Content Stored in a Memory," now issued as U.S. Pat. No. 7,953,443, which claims priority from and is a continuation of U.S. patent application Ser. No. 10/764,668 filed on Jan. 26, 2004 and entitled "Systems and Methods for Securing Personal or Private Content Stored in The Internal Memory of a Mobile Terminal," now issued as U.S. Pat. No. 7,406,334, the contents of each of which are expressly incorporated herein by reference in their entireties.

FIELD OF THE DISCLOSURE

The present disclosure relates to cell phones and other wireless mobile terminals having an internal memory. More particularly, the present disclosure relates to terminals, systems, and methods for securing content stored in the internal memory of a mobile terminal.

BACKGROUND

In many regions of the world, a mobile communications terminal such as a cell phone is not locked to a specific network service provider. Instead, subscribers to a network are issued a smart card, such as a Subscriber Identity Module (SIM) or other removable plastic card that uniquely identifies the user account to the network, handles authentication and provides data storage for user data such as phone numbers and network information. The SIM may also contain applications that can be accessed by the phone. The phone itself is fungible because a subscriber can use any phone that accepts a SIM.

SIM cards often operate in conjunction with a phone that operates in a wireless network environment such as the Global System for Mobile Communications (GSM) network. In a GSM environment, any phone can be used by inserting a SIM card into the phone and accessing the network. More significantly, however, inserting a SIM card into a GSM phone not only provides access to the network, but also provides access to any private content stored in the internal memory of the phone. If an owner loses, loans, discards, or otherwise loses control of the phone, anyone with a SIM card can access the owner's private content on the phone.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawings, and in which.

DETAILED DESCRIPTION

Figure 1:
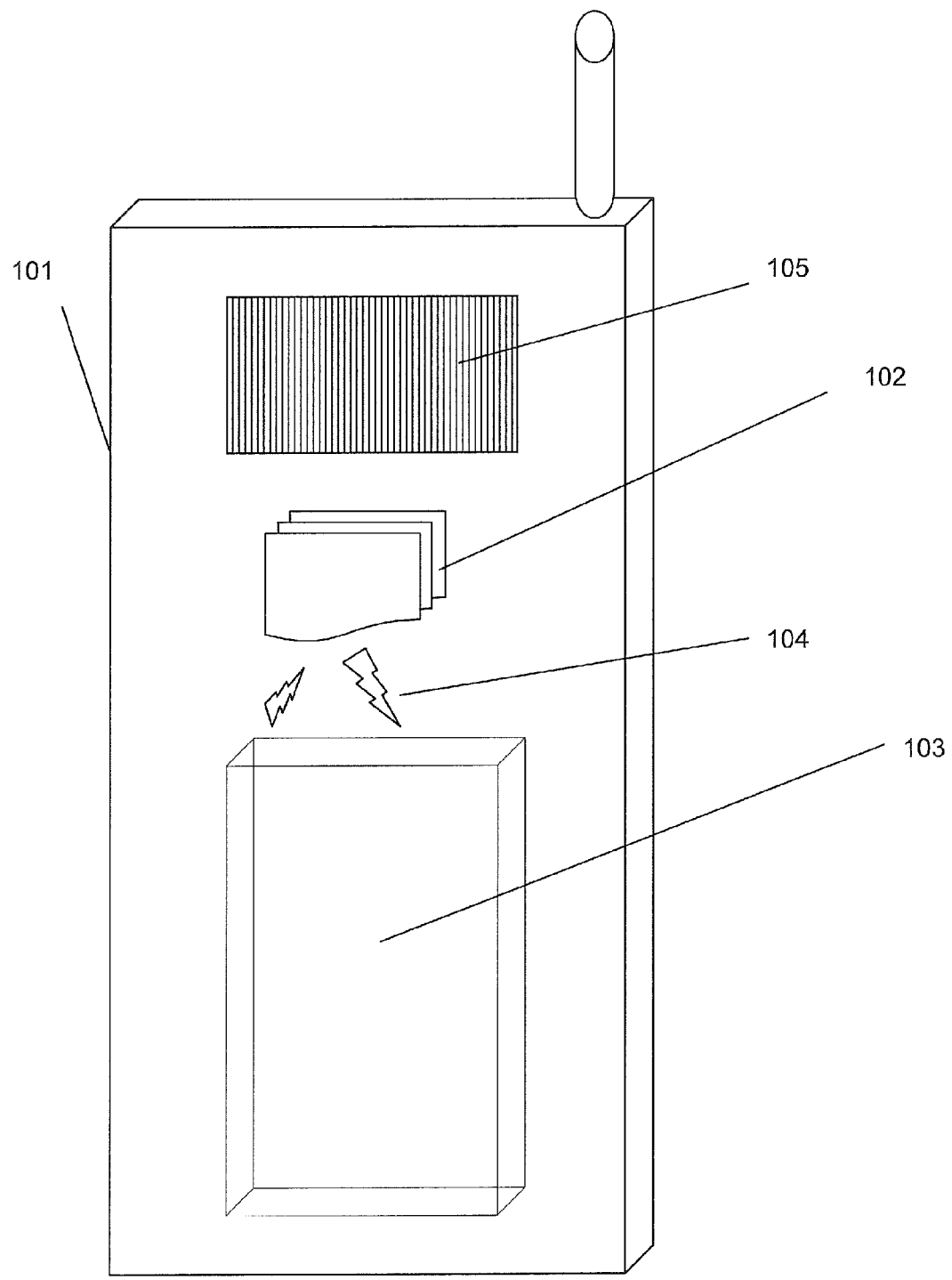
FIG. 1 is a block diagram showing an exemplary mobile terminal of one embodiment of the present disclosure.

In view of the foregoing, the present disclosure, through one or more of its various aspects, embodiments and/or specific features or sub-components, is thus intended to bring out one or more of the advantages that will be evident from the description. The embodiments are described with frequent reference to phones or cell phones. It is understood that a phone is merely an example of a specific embodiment of the present disclosure, which is directed generically to mobile equipment, systems and methods within the scope of the disclosure, together with equipment, systems and methods of Public Switched Telephone Networks (PSTN) and Internet Protocol (IP) telephony, including but not limited to Voice-Over IP (VoIP). The terminology, therefore, is not intended to limit the scope of the disclosure.

The mobile equipment has a processor for executing instructions and commands. The mobile equipment communicates with a SIM using commands and protocols executed by the processor. The SIM has an internal memory that stores data, including but not limited to International Mobile Subscriber Identity (IMSI) information that provides the unique identity of a subscriber. The SIM may also store a Mobile Station International ISDN (MSISDN) number. SIM cards often operate in conjunction with a phone that operates in a wireless network environment such as, for example, in the GSM network.

GSM, a Second Generation (2G) wireless network technology, is the de facto European standard for digital cellular telephone service, and it is also available in the Americas. GSM is the most widely used of the three digital wireless telephone technologies (IS-136, GSM and IS-95), and it supports voice, data, text messaging and cross-border roaming. GSM operates in multiple frequency bands, GSM 850, GSM 900, GSM 1800, and GSM 1900. When GSM is working on a radio frequency band of 1800 MHz, it is sometimes referred to as DCS or GSM1800. When GSM is working in a frequency band of 1900, it is often referred to as PCS. The SIM is an essential element in a GSM network.

General Packet Radio Service (GPRS) is a radio technology for GSM networks that adds packet-switching protocols. As a 2.5G technology, GPRS enables high-speed packet data access (up to 115 kbps) for wireless Internet and other data communications. GPRS networks enhance or enable short message service (SMS), multimedia message service (MMS), email, games, and wireless application protocol (WAP) applications to a cell phone.

Enhanced Data rate for GSM Evolution (EDGE) is an enhancement to the GPRS services. EDGE increases transmission speeds (up to 384 kbps) within a GSM carrier space of 200 kHz and enables the transmission of large amounts of data. With EDGE, mobile operators can offer multimedia services and other broadband applications through mobile phones.

IS-136 is a wireless communication standard that has mostly been replaced by GSM. Nevertheless, in certain parts of the world, including North America, mobile equipment that is capable of both IS-136 and GSM standards will be available during the transition to universal adoption of GSM Standards. IS-136 uses Time Division Multiple Access (TDMA), which divides each 30 kHz channel into six time slots and enables three simultaneous voice calls over the channel. GSM networks use TDMA in one form or another. IS-136 networks are operated in the United States, Latin America, New Zealand, parts of Russia and Asia Pacific.

Code Division Multiple Access (CDMA) is a digital wireless technology that uses a spread spectrum technique to spread a signal across a wide frequency band. IS-95 is a 2G technology that employs CDMA. There are numerous wireless communication standards based on CDMA technology currently deployed around the world.

Wideband Code Division Multiple Access (WCDMA), a third generation (3G) technology defined in the Third Generation Partnership Project (3GPP), has been adopted in Europe and other regions of the world as the current state of GSM evolution. 3GPP2 standardizes multiple variants, including CDMA2000 1X (2.5G), CDMA2000 1xEV-DO and CDMA2000 1xEV-DV. Wideband CDMA, one of the radio access technologies for Universal Mobile Telecommunications System (UMTS) in Europe, is the worldwide 3G standard for GSM evolution. It supports very high-speed multimedia services such as full-motion video, Internet access and video conferencing. WCDMA uses one 5 MHz channel for both voice and data, offering data speeds up to 2 Mbps. WiFi is yet another wireless technology relevant to the present disclosure.

For convenience, all of the wireless network technologies above will be referred to as GSM technologies, unless otherwise specified. GSM, as well as PSTN and VoIP, network technologies and capabilities have advanced synergistically with advances in microprocessor technology to provide cell phones and other terminals with increasingly greater capacity to receive, store and process voice and data information. Examples of such terminals include smart phones, which have more internal memory than ordinary voice-oriented phones; camera phones, which can take a digital photograph, store the image and receive and transmit digital images; phone terminals that provide gaming consoles; and communicators, which is a generic term for any information-centric mobile terminal that combines a fully featured personal digital assistant (PDA) and a mobile phone in one terminal.

Such capabilities challenge the interchangeability of GSM phones because, with use, the phones become laden with private content. In a GSM environment, any phone can be used by inserting a SIM card into the phone and accessing the network. More significantly, however, inserting a SIM card into a GSM phone not only provides access to the network, but also provides access to the private content stored in the internal memory of the phone. If an owner loses, loans, discards, or otherwise loses control of the phone, anyone with a SIM card can access the owner's private content on the phone.

Accordingly, FIG. 1 is a block diagram showing an exemplary mobile terminal of one embodiment. As depicted in FIG. 1, the embodiment provides a mobile terminal 101 with a memory for storing private content 102, and a SIM 103. The mobile terminal 101 has a SIM reader (not shown) in communication with a processor (also not shown) for executing instructions and commands. Subscriber identity on the SIM 103 is uniquely established with International Mobile Subscriber Identity (IMSI) information. IMSI information is particularly well adapted to the present disclosure because IMSI information is secure and not editable. In an alternative embodiment, a Mobile Station (MS) International "Integrated Services Digital Network" (ISDN) (MSISDN) number that further identifies the SIM is used in combination with the IMSI information to uniquely identify the subscriber. Private content 102 is labeled or otherwise linked to the content owner's IMSI information or IMSI/MSISDN combination. The alternative embodiments of IMSI information or an IMSI/MSISDN combination are referred to hereinafter on occasion as IMSI/MSISDN.

A security function 104 associates the IMSI or IMSI/MSISDN combination identifier of private contents 102, stored in the mobile terminal 101 memory, with the IMSI or IMSI/MSISDN combination identifier on SIM 103 and grants access to private content 102 only to the authorized SIM 103. In one embodiment, the security function 104 includes but is not limited to, for example, a processor, or software executed by a processor, that operates between the SIM reader and the terminal memory to perform correlative operations on the corresponding IMSI or IMSI/MSISDN combination. The mobile terminal 101 performs the appropriate output (access or notice of denial of access) to display viewer 105.

Figure 2:
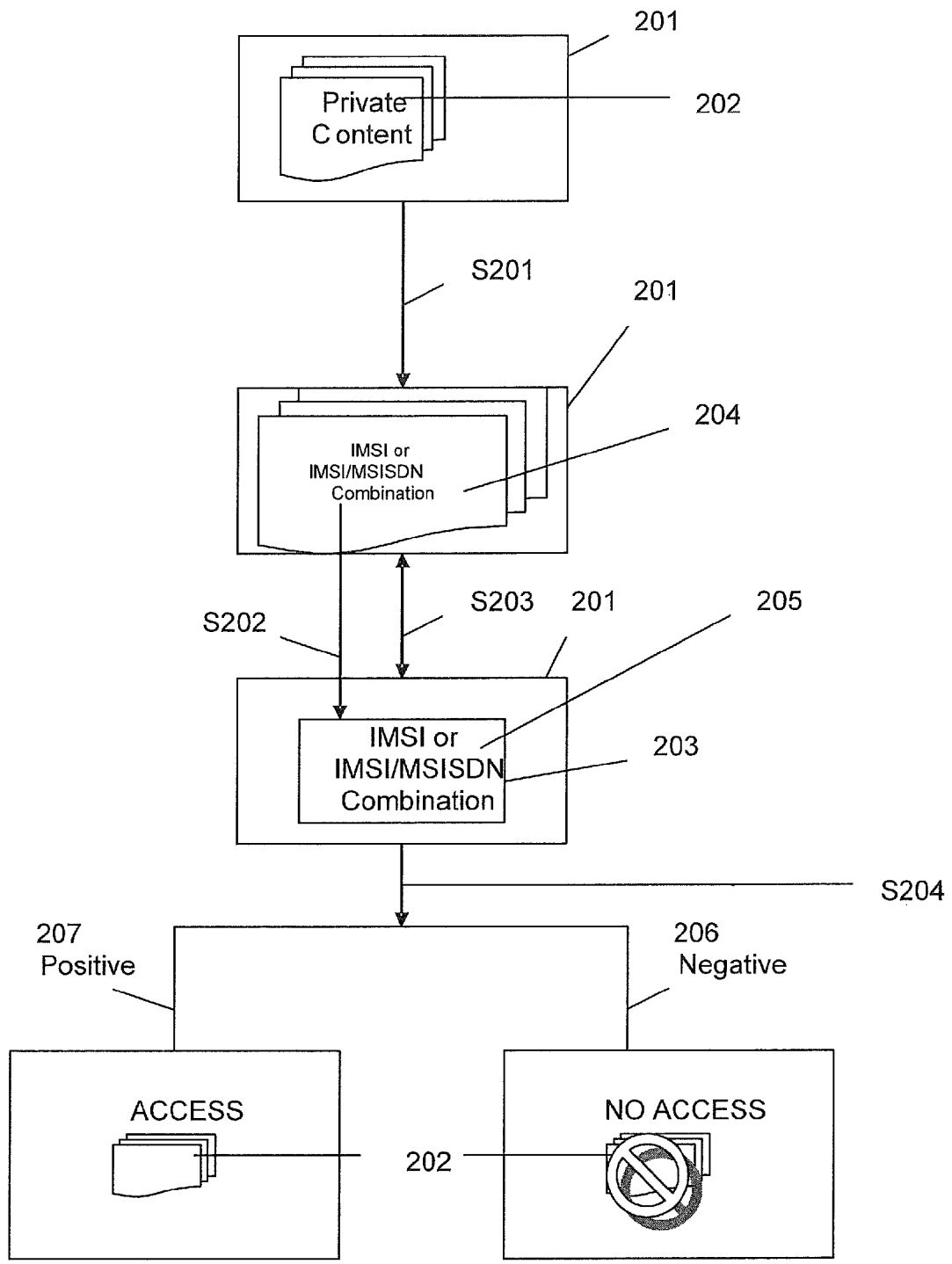
FIG. 2 is a flow chart of an exemplary method of the present disclosure.

FIG. 2 is a flow chart of an exemplary method of the present disclosure. An exemplary method is illustrated for controlling access to private content 202 stored in a GSM/SIM mobile terminal 201. In step S201, the private content 202 is provided with IMSI/MSISDN information 204. Step S202 associates the private content IMSI/MSISDN 204 with the IMSI/MSISDN 205 of SIM 203. In step S203, the IMSI/MSISDN 204 of the private content 202 is compared with the IMSI/MSISDN 205 of the SIM 203. In step S204, access to the private content 202 is denied when the comparison result 206 is negative, or, in step S205, access to the private content 202 is granted when the comparison result 207 is positive.

Figure 3:
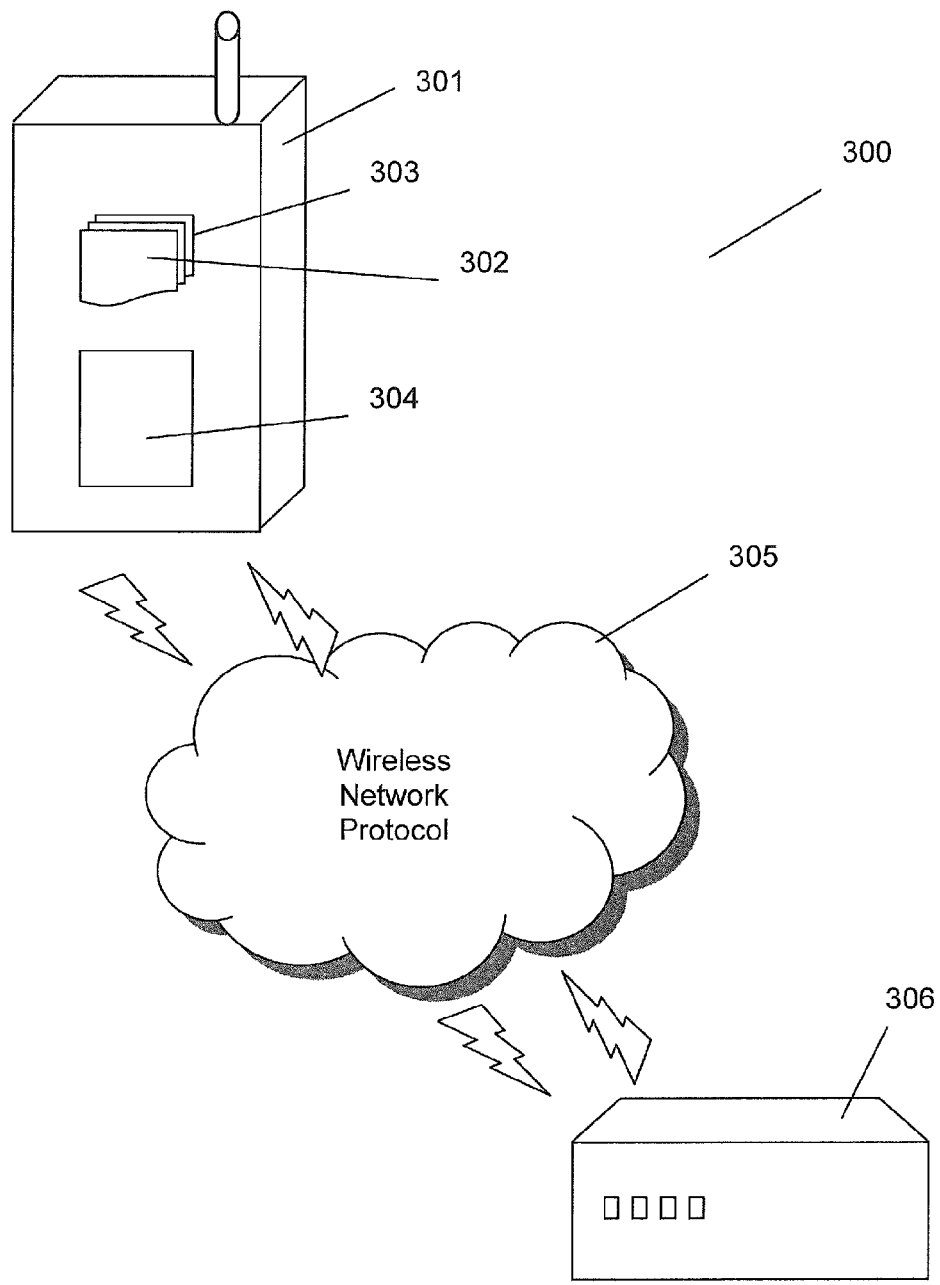
FIG. 3 is a block diagram showing an exemplary system of one embodiment of the present disclosure.

FIG. 3 is a block diagram showing an exemplary system. The exemplary system of FIG. 3 prevents unauthorized access to private content stored in the internal memory of a mobile terminal. System 300 includes, but is not limited to, mobile equipment 301 that accesses a wireless network by radio transmission and reception using, for example, 3GPP network protocol 305. Mobile equipment 301 has private content 302 stored on the internal memory 303 of the mobile equipment 301. The private content 302, or a pre-determined portion thereof, is associated with IMSI and MSISDN information unique to an owner of the private content 302 or to an owner of the pre-defined portion of the private content.

System 300 further includes at least one SIM 304 containing subscriber information and service and/or application profiles of the subscriber. SIM 304 identifies the subscriber by IMSI and MSISDN information stored on SIM 304.

System 300 operates so that access to all or to the pre-defined portion of the private content 302 occurs only when the IMSI/MSISDN information of SIM 304 correlates to the IMSI/MSISDN information of the private content 302, or of the pre-defined portion of the private content 302, stored in the memory of the mobile equipment 301.

A particular embodiment of system 300 further includes radio transmission and reception via wireless network protocol 305. Network protocols contemplated by system 300 include, but are not limited to, GSM, GPRS, EGPRS, UMTS and 3GPP.

A portion of private content 302 may be factory installed settings and information or may be obtained from tangible medium such as smart cards, game cartridges, and the like, which are able to be physically connected to mobile equipment 301. Additionally, a portion of private content 302 may be downloaded from content provider 306, such as a file or email server, connected to mobile equipment 301 via network protocol 305. Content provider 306 of system 300 may be any suitable medium that addressably stores digital content such that the content may be wirelessly downloaded to mobile equipment 301.

Downloading content over wireless networks, or by means of wireless connections to content servers, has become an important source of revenue for wireless carriers and content providers. The emergence of technologies such as Bluetooth®, and the popularity of downloading ring tones are merely the leading edge of a burgeoning economic sector in the wireless industry. Ring tones, software, games, images (jpeg, gif, tiff, and so forth) video (e.g., mpeg), and audio (e.g., way, MP3), are all familiar downloadable content, but content further includes karaoke software, television image capture, remote control software to control toys and other RC devices, electronic keys, massage vibrations, and any content that can be stored digitally.

Embodiments of the terminal include one or more MMC memory card slot for MP3 files, and one or more digital voice recorder. Private content stored on a "smart skin" of a phone are contemplated by the present disclosure. PSTN and VoIP compatible terminals are also contemplated by embodiments of the present disclosure.

Private content may be organized into two categories, discrete content and contact content. Discrete content includes, but is not limited to, discrete items such as an MP3 file, a jpeg image, or a ring tone. Items of discrete content may be copyright protected, such as MP3 format copyright songs or ring tones, or the item may be personal such as a family photograph in jpeg format. Pursuant to the present disclosure, each item of discrete content may be protected by a pre-defined terminal/SIM IMSI or IMSI/MSISDN combination.

Contact content is content used for various services such as email, instant text messaging, instant voice messaging, voice mail, Push-To-Talk (PTT), and includes, but is not limited to, SIP address, phone books, address books, contact lists, and buddy lists. Pursuant to the present disclosure, each group of contact content may be protected by a defined terminal/SIM IMSI or IMSI/MSISDN combination. The present disclosure contemplates that the terminal IMSI/MSISDN be the same as the SIM IMSI/MSISDN or that the IMSI/MSISDN of the terminal and the SIM merely correlate in a predetermined combination to grant access to the private content.

An advantage of the disclosed system is that it does not require Trusted Third Party (TTP) domain applications in a Mobile station application Execution Environment (MExE). Applications in the TTP domain are signed with a key that can be verified back to a trusted root certificate on an MExE device. TTP domain applications, trusted root certificates and MExE are strictly java-based security protocols. The disclosed system, in contrast, is not java dependent. Pursuant to the disclosed system, any suitable algorithm may accomplish correlation of the terminal IMSI/MSISDN information with the SIM IMSI/MSISDN information without recourse to an MExE administrator protocol.

A further advantage of the disclosed system is the terminal need not be disabled in order to protect the private content. That is, a mobile phone terminal, if lost or stolen, may continue to function as a phone with a SIM in a GSM network environment. The private content stored on the phone, however, will remain inaccessible and protected. Someone may use the phone for an emergency call, for example, with a strange SIM card, but they would not be able to access the phone owner's buddy list or family photo images.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in all its aspects. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

In accordance with various embodiments of the present disclosure, the steps and methods described herein are intended, inter alia, for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the scope of the invention is not limited to such standards and protocols. Each of the standards for Internet and other packet switched network transmission public telephone networks represent examples of the state of the art. Such standards are periodically superseded by faster or more efficient equivalents having essentially the same functions. Replacement standards and protocols having the same functions are considered equivalents. Accordingly, it is intended that the scope of the invention including such alternatives, modifications, and variations contemplated shall be defined by the appended claims.

What is claimed is:

1. An apparatus comprising:
   a processor; and
   a memory storing instructions that, when executed by the processor, cause the processor to perform operations comprising;
      accessing a private content identifier associated with private content, wherein the private content identifier is based on international mobile subscriber identity information associated with a memory device and a mobile station integrated services digital network number; and
      determining whether to grant or deny access to the private content based on the private content identifier and a memory device identifier associated with the memory.

2. The apparatus of claim 1, wherein the operations further comprise performing a comparison of the private content identifier to the memory device identifier, wherein the determination of whether to grant or deny access to the private content is based on a result of the comparison.

3. The apparatus of claim 2, wherein determining whether to grant or deny access to the private content comprises denying access to the private content when the result of the comparison is negative.

4. The apparatus of claim 2, wherein determining whether to grant or deny access to the private content comprises granting access to the private content when the result of the comparison is positive.

5. The apparatus of claim 1, wherein the operations further comprise reading, at a memory device reader, the memory device identifier of the memory.

6. The apparatus of claim 1, further comprising a mobile phone, wherein the mobile phone includes the processor and the memory.

7. The apparatus of claim 1, wherein the mobile station integrated services digital network number is associated with an authorized user.

8. The apparatus of claim 1, wherein the memory device identifier includes the mobile station integrated services digital network number associated with the memory.

9. The apparatus of claim 1, wherein the memory comprises a subscriber identity module.

10. The apparatus of claim 9, wherein a combination of the mobile station integrated services digital network number and the international mobile subscriber identity information is used to identify a subscriber associated with the subscriber identity module.

11. The apparatus of claim 1, wherein the private content is downloaded from a content provider.

12. The apparatus of claim 1, wherein the private content comprises factory installed settings.

13. The apparatus of claim 1, wherein the memory device identifier is associated with secure and non-user editable information associated with the memory.

14. A method comprising:
  accessing, at a mobile terminal, a private content identifier associated with private content, wherein the private content identifier is based on international mobile subscriber identity information associated with a memory device and a mobile station integrated services digital network number; and
  determining whether to grant or deny access to the private content based on the private content identifier and a memory device identifier associated with the memory device.

15. The method of claim 14, further comprising reading the memory device identifier of the memory device.

16. The method of claim 14, wherein access to the private content is denied when a result of a comparison of the private content identifier to the memory device identifier is negative.

17. The method of claim 14, wherein access to the private content is granted when a result of a comparison of the private content identifier to the memory device identifier is positive.

18. The method of claim 14, wherein the memory device is a subscriber identity module.

19. A computer-readable storage device storing instructions that, when executed by a processor, cause the processor to perform operations comprising:
  accessing a private content identifier associated with private content, wherein the private content identifier is based on international mobile subscriber identity information associated with a memory device and a mobile station integrated services digital network number; and
  determining whether to grant or deny access to the private content based on the private content identifier and a memory device identifier associated with the memory device.

20. The computer-readable storage device of claim 19, wherein the operations further comprise performing a comparison of the private content identifier to the memory device identifier, wherein access to the private content is denied when a result of the comparison is negative and access to the private content is granted when the result of the comparison is positive.

* * * * *